United States Patent [19]

Hoehn

[11] 4,449,099

[45] May 15, 1984

[54] RECORDING DECIMATED MAGNETOTELLURIC MEASUREMENTS WITH COHERENCE

[75] Inventor: Gustave L. Hoehn, Dallas, Tex.

[73] Assignee: Mobil Oil Corporation, New York, N.Y.

[21] Appl. No.: 293,786

[22] Filed: Aug. 18, 1981

[51] Int. Cl.³ .............................................. G01V 3/08
[52] U.S. Cl. ................. 324/350; 324/77 R; 367/45; 367/49
[58] Field of Search ............... 324/350, 348, 349, 357, 324/360, 363, 365, 303, 77 R, 77 A, 77 B; 367/49, 43, 45, 17; 328/165

[56] References Cited

U.S. PATENT DOCUMENTS

| | | | |
|---|---|---|---|
| 2,390,270 | 12/1945 | Piety | 324/357 |
| 2,677,801 | 5/1954 | Cagniard | 324/1 |
| 3,188,558 | 6/1965 | Yungul | 324/1 |
| 3,541,458 | 11/1970 | Klund | 364/421 X |
| 4,037,190 | 7/1977 | Martin | 367/49 X |
| 4,286,218 | 8/1981 | Bloomquist et al. | 324/350 |
| 4,339,810 | 7/1982 | Nichols et al. | 367/49 |

FOREIGN PATENT DOCUMENTS 643187  6/1962  Canada .................................. 324/303

OTHER PUBLICATIONS

Real Time Fourier Transformation of Magnetotelluric Data, Wight, Bostick, Jr., and Smith 1977, Electrical Geophysics Research Laboratory.

Primary Examiner—Gerard R. Strecker
Assistant Examiner—Warren S. Edmonds
Attorney, Agent, or Firm—A. J. McKillop; M. G. Gilman; J. F. Powers, Jr.

[57] ABSTRACT

In magnetotelluric exploration, channels of measurements of the earth's electric and magnetic field are digitized. Blocks of digital samples are transformed into frequency domain representations of the power spectra, including amplitude and phase, at selected harmonics. The coherence between the power spectra from different channels is determined and compared to a threshold. The power spectra which have a coherence exceeding the threshold are stacked and recorded on magnetic tape.

10 Claims, 8 Drawing Figures

Fig. 4A ively lower frequency samples. The steps of selecting, transforming, determining the coherence, comparing, stacking, and storing are repeated for each of the successively lower frequency samples. Because of this successive decimation procedure, the coherence criteria is satisfied at a lower frequency level so that rejection does not occur. In this way, useful magnetotelluric records are recorded even though noise obscures the higher frequency records which are not recorded.
4,449,099

RECORDING DECIMATED MAGNETOTELLURIC MEASUREMENTS WITH COHERENCE

BACKGROUND OF THE INVENTION

This invention relates to magnetotelluric geophysical exploration and more particularly to recording magnetotelluric signals along lines of exploration on the surface of the earth.

It has long been known that telluric currents circulate beneath the surface of the earth. The prior art suggests that the measurement of these naturally occurring currents will indicate the resistivity of the earth and hence the geophysical characteristics of the subsurface. These telluric currents are subject to variations caused by external influences, such as sunspot activity. Because these variations are unpredictable, measurement of telluric currents was little used as a geophysical exploration tool until Louis Cagniard devised a mathematical technique capable of accounting for these variations. His work is represented, for example, in U.S. Pat. No. 2,677,801 wherein he proposes measuring not only the telluric currents, but also the magnetic field at a measurement station on the earth's surface. Cagniard teaches that a specific relationship exists between the measured orthogonal components of the earth's magnetic field and the measured orthogonal components of the earth's electric (or "telluric") field, and that spatial variations therein may be used to derive specific information regarding the subterranean structure of the earth. As certain structures are known to be indicative of the presence of minerals, these magnetotelluric measurements are a useful prospecting tool.

The Cagniard method of magnetotelluric exploration usually involves the measurement of signals representing the magnetic field and the electric field in two orthongal directions, usually denoted by $H_x$, $H_y$, $E_x$ and $E_y$ respectively. In this type of exploration it is desirable to record the electric field and the magnetic field at spaced locations along a line of exploration.

"Multiple Site Magnetotelluric Measurements", Ser. No. 063,491, filed Aug. 6, 1979, U.S. Pat. No. 4,286,218 Bloomquist, Hoehn, Norton and Warner, discloses a method of magnetotelluric exploration in which multiple measurements of the earth's electric field as a function of time are made at spaced locations on the earth's surface. One or more measurements of the earth's magnetic field are made simultaneously and recorded.

Real Time Fourier Transformation of Magnetotelluric Data, Wight, Bostick, Jr., and Smith, 1977, Electrical Geophysics Research Laboratory, describes the Fourier transformation of time series measurements into the frequency domain. The power spectra of the magnetotelluric measurements are recorded. The present invention is an improvement on the work described in this paper. U.S. Pat. No. 3,188,558, Yungul, also describes the conversion of magnetotelluric time measurements into their frequency spectra.

One of the problems in magnetotelluric exploration is that an excessively large number of measurement samples are generated. Recording all of these samples and transporting the tapes back to the location where they are processed is cumbersome. Wight, et al have developed a technique which may be referred to as "successive decimation" which reduces the number of measurement samples which must be recorded without seriously detracting from the quality of the measurements.

Another problem encountered in magnetotelluric exploration is the generation of noise which obscures the measurements. Magnetotelluric measuring instruments are particularly subject to man-made noise spikes such as those caused by a vehicle moving in the area of the measurements. One object of the present invention is to automatically detect magnetotelluric records having noise spikes and eliminate those records from the processing sequence which takes place before recording.

SUMMARY OF THE INVENTION

In accordance with the present invention, the coherence between the power spectra of magnetotelluric measurements from different spaced locations is compared to a threshold. Only those power spectra which have a coherence exceeding this threshold are stacked and recorded.

The present invention greatly reduces the number of measurement samples which are recorded in the field. The present invention also eliminates noisy records before they are recorded.

In carrying out the invention, blocks of digital samples representing magnetotelluric time measurements are transformed into frequency domain representations of the power spectra, including amplitude and phase, at selected harmonics. The coherence between the power spectra representing measurements obtained from different channels is determined and compared to a threshold. Only those power spectra having a coherence exceeding this threshold are stacked and stored.

Further in accordance with the invention, the digital samples representing the time measurements are successively filtered to produce successively lower frequency samples. The steps of selecting, transforming, determining the coherence, comparing, stacking, and storing are repeated for each of the successively lower frequency samples. Because of this successive decimation procedure, the coherence criteria is satisfied at a lower frequency level so that rejection does not occur. In this way, useful magnetotelluric records are recorded even though noise obscures the higher frequency records which are not recorded.

The foregoing and other objects, features and advantages of the invention will be better understood from the following more detailed description and appended claims.

SHORT DESCRIPTION OF THE DRAWINGS

FIGS. 3 and 3A together show the apparatus of the present invention used to suppress noise spikes.

DESCRIPTION OF THE PREFERRED EMBODIMENT

Figure 1:
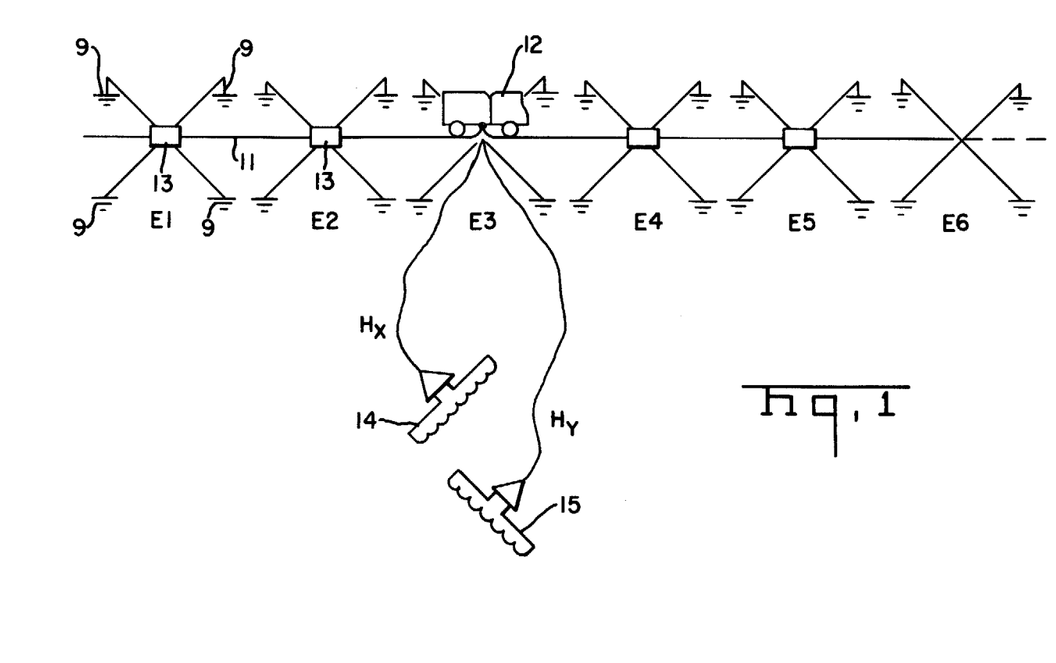
FIG. 1 shows a field procedure for making magnetotelluric measurements.

In FIG. 1, the electric field is measured at six locations, along a line of exploration. These measurements are transmitted over a cable 11 to an exploration vehicle 12 where the measurements are recorded. As is conventional in magnetotelluric exploration, the electric field is measured at each location with four sensors 9 which generate signals representing the electric field variations in the two orthogonal directions. Magnetic coil sensors 14 and 15, oriented similarly to the axes defined by the orientation of the electric field sensors 9, measure the magnetic field variations of the earth in the vicinity of the exploration vehicle 12. The measurements $H_x$ and $H_y$ from coils 14 and 15 are recorded simultaneously with the recording of electric field measurements.

Figure 2:
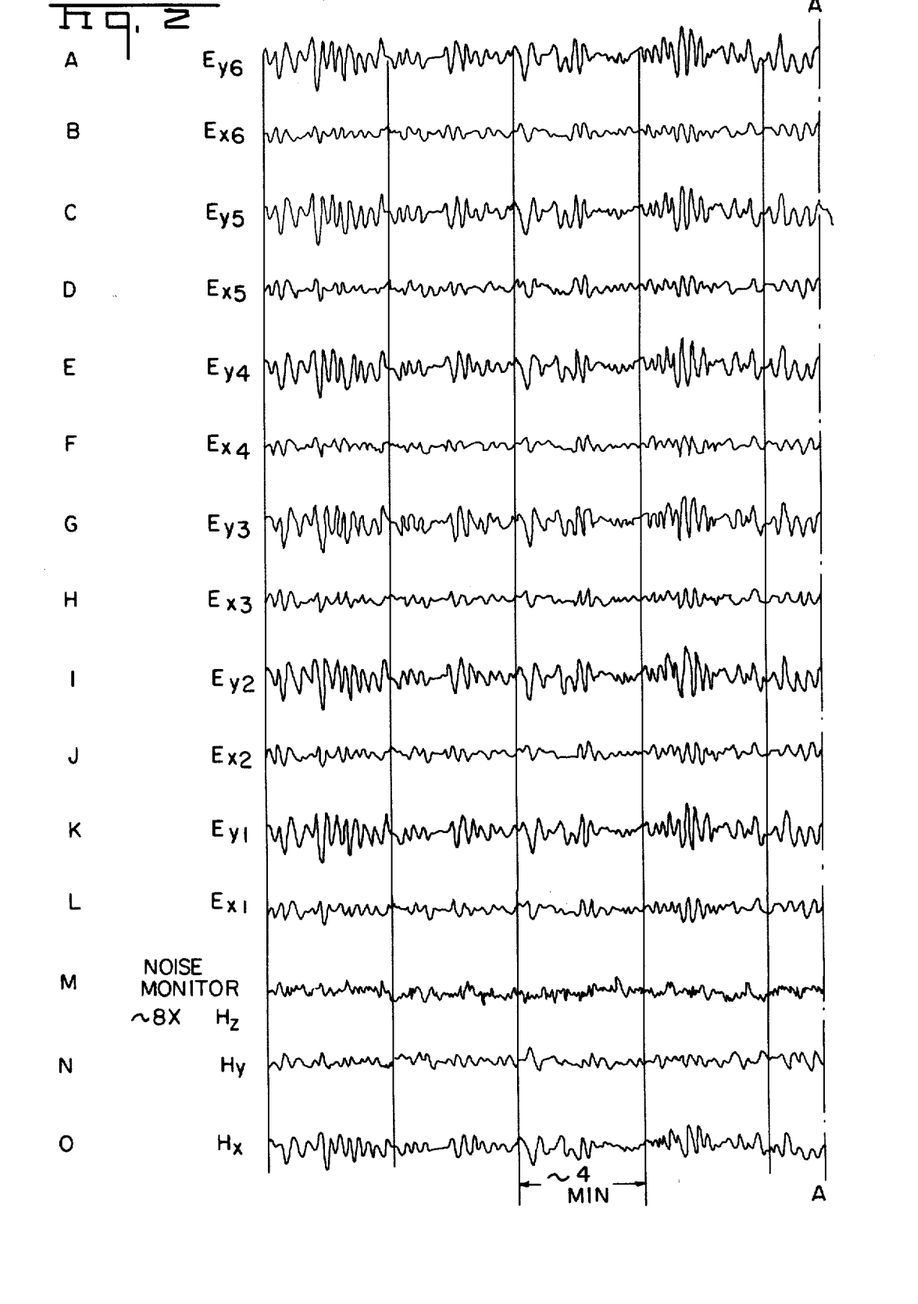
FIGS. 2, 2' and 2" show fifteen channels of magnetotelluric measurements.

FIGS. 2,2' and 2'' show fifteen channels of magnetotelluric measurements with about 4 minutes of measurement between successive ordinate lines. These include twelve channels of electric field measurements $E_{x1}$, $E_{y1}$, $E_{x2}$, $E_{y2}$, ... $E_{x6}$, $E_{y6}$, two channels of magnetic field measurements, $H_x$ and $H_y$, and one channel (FIG. 2M) in which an H pre-amplifier had its input short circuited (i.e., no coil sensor connected) and the pre-amp output noise was monitored. This trace is typically at a gain of 8 times that of the other H traces.

Referring to FIG. 3, these measurements are digitized into samples by the digitizer 16. For example, each channel is sampled at 2 millisecond intervals with 32,768 digital samples being generated for each channel. Contiguous 32-point blocks of samples are selected as indicated at 17. These blocks are transformed into frequency domain representations of the power spectra, including amplitude and phase, at selected harmonics. For example, the amplitude and phase of each of the 32-point blocks is obtained at the sixth and eighth harmonics. This operation is indicated at 18. In the example under consideration, the amplitude and phase are obtained at the sixth harmonic, 90 Hz, and at the eighth harmonic, 125 Hz. This transformation is carried out by a technique known in geophysics as a "Fast Fourier Transform" (FFT). One procedure which can be used is described in Cooley, J. W., Tukey, J. W., An Algorithm For Machine Calculation of Complex Fourier Series, Mathematical Computation, Vol. 19, 1965, pp. 297-301. Fourier transformations are also described in the aforementioned Wight, et al paper.

In accordance with the present invention, the coherence is determined between the power spectra representing measurements obtained from different channels. The determination of coherence is indicated at 19. In carrying out this step, the amplitude and phase of the power spectra at the sixth and the eighth harmonics are averaged for two successive 32-point blocks of samples. Coherence functions are then obtained for combinations of two of the fifteen data channels. One particularly useful coherence is with the $H_y$ channel. The coherence between $H_y$ and each of the other channels is denoted $E_{xn}*H_y$. One procedure which can be used to determine coherence is described in Random Data: Analysis And Measurement Procedures, Bendat and Piersol, Wiley-Interscience, Inc., New York, p. 141. The coherence function is an indicator of noise spikes. For example, if a spike of noise lasting for less than 32 or 64 points occurred on $E_{x1}$, then the coherence function $E_{x1}*H_y$ would be lower than other coherences $E_{xn}*H_y$. The coherence is a value between 0 and 1 with higher values indicating high coherence and lower values indicating low coherence.

As an example, five successive blocks of samples are denoted a, b, c, d, e. The coherence between successive blocks a and b is denoted Coh1, between blocks b and c is Coh2, between c and d is Coh3, and between d and e is Coh4. The coherence determination proceeds on a block by block basis. If the coherences Coh2 and Coh3 are below a threshold value, sample block c is faulty and should be dropped.

Referring to FIG. 3, a threshold value is set to which all $E_{xn}*H_y$ coherences are compared. The comparison step is indicated at 20. All power spectra having a threshold below the threshold are rejected as indicated at 21.

The power spectra which satisfy the coherence criteria are stacked as indicated at 22. Various stacking processes used in processing geophysical data are known and can be used. The number of rejected power spectra (or alternatively, the number of the accepted power spectra) are counted as indicated at 23. The stacked powers are normalized as indicated at 24. The stacked powers are recorded on the magnetic tape transport 25.

In accordance with the present invention, the foregoing procedure is repeated at each decimation level. These decimation levels are obtained by the digital filters which include filters 26 and 27. While only three decimation levels are shown in FIG. 3, ordinarily, about ten levels of decimation will be provided. Digital filters 26, 27, and others, are 5-point digital filters which produce successively lower frequency, longer sampling interval, samples. For example, digital filter 26 produces an output having 4 millisecond samples and digital filter 27 produces 8 millisecond samples, and successive filters each increase the sampling interval by a factor of 2. (The term "decimation" has been applied to such a technique even though "decimation" implies a factor of 10 rather than 2. The term "binary decimation" will be used herein to describe the successive filtering as shown in the example.)

The steps of selecting 32-point blocks, transforming into the frequency domain at selected harmonics, determining coherence, comparing it to a threshold, stacking the power spectra which passed the coherence test, and normalizing are repeated for each decimation level. These operations are denoted by the reference numerals 17a-24a and 17b-24b for the two successive levels of decimation shown in FIG. 3. The noise spikes are successively filtered by the filters 26, 27 and other filters. Ultimately, at some lower frequency level, the coherence criteria will be satisfied so that no further rejection of records occurs. In this manner, usable records are preserved even though the noise spikes obscure the high frequency components of the records.

Figure 4:
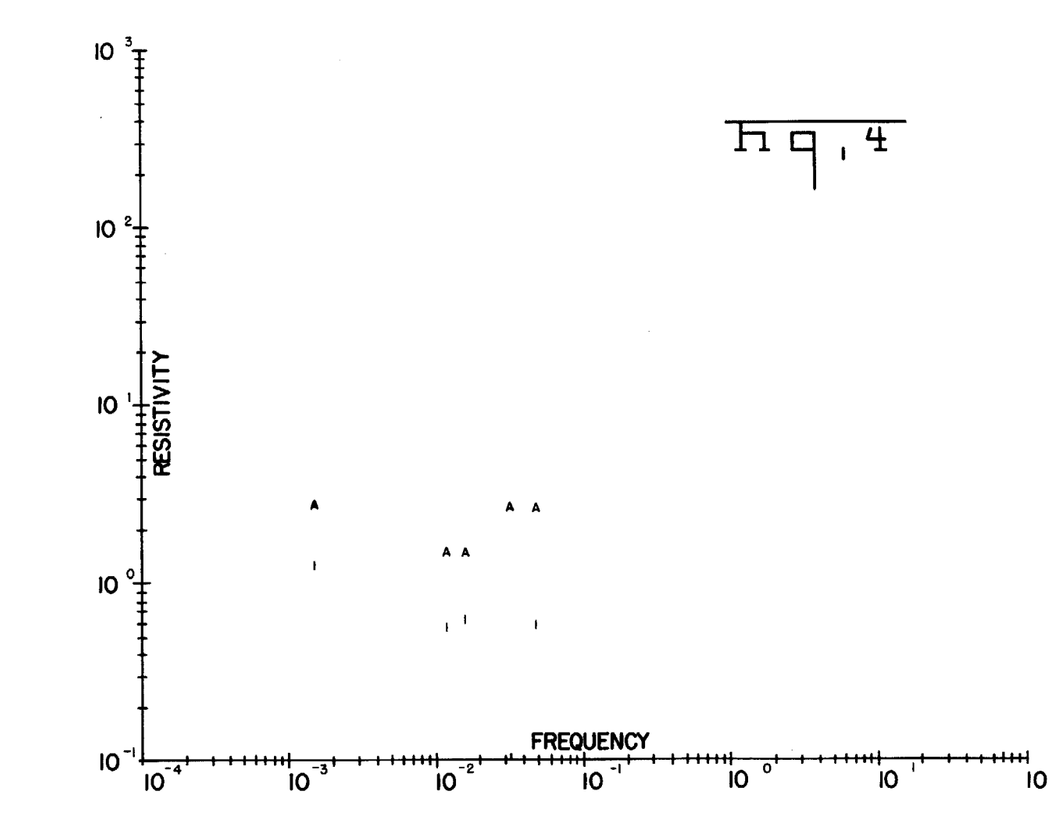
FIGS. 4 and 4A show magnetotelluric data which has been recorded and processed without the present invention and with the present invention, respectively.
Figure 4A:
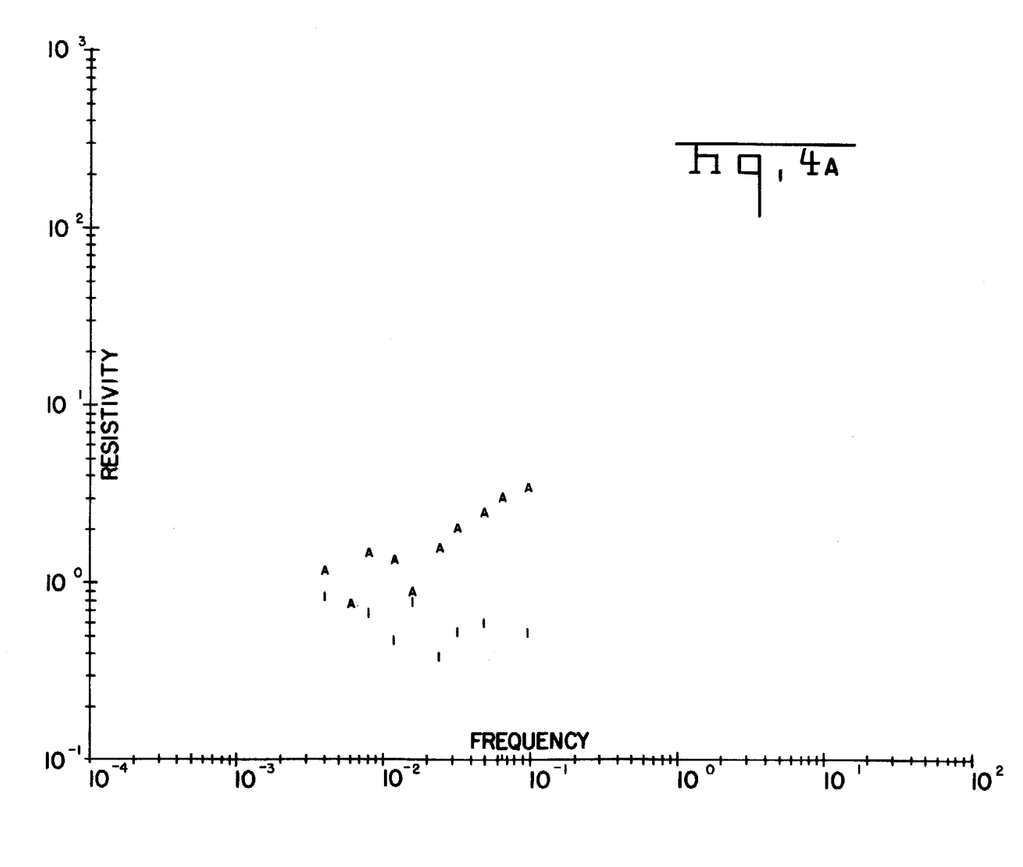
Figure 7:
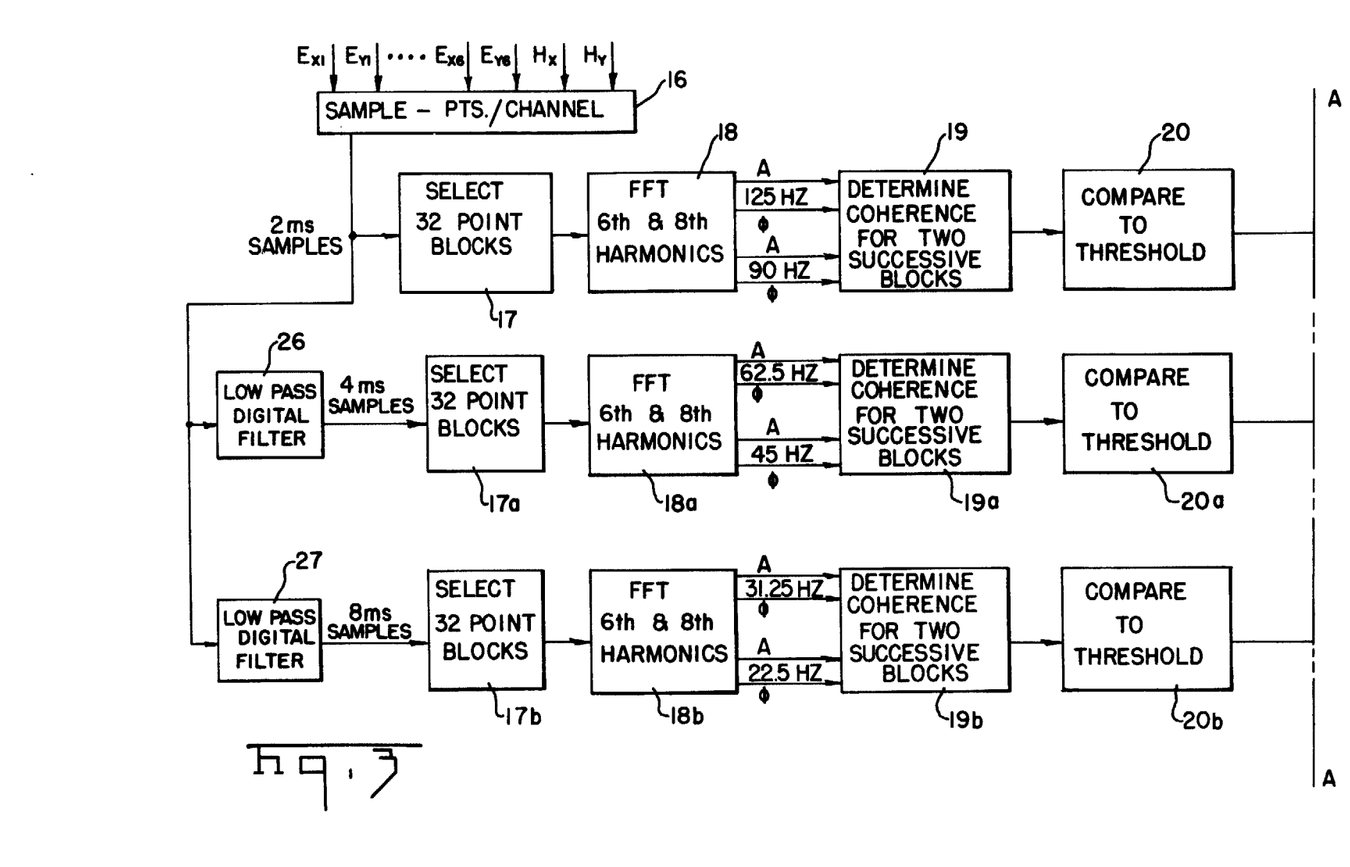
Figure 7A:
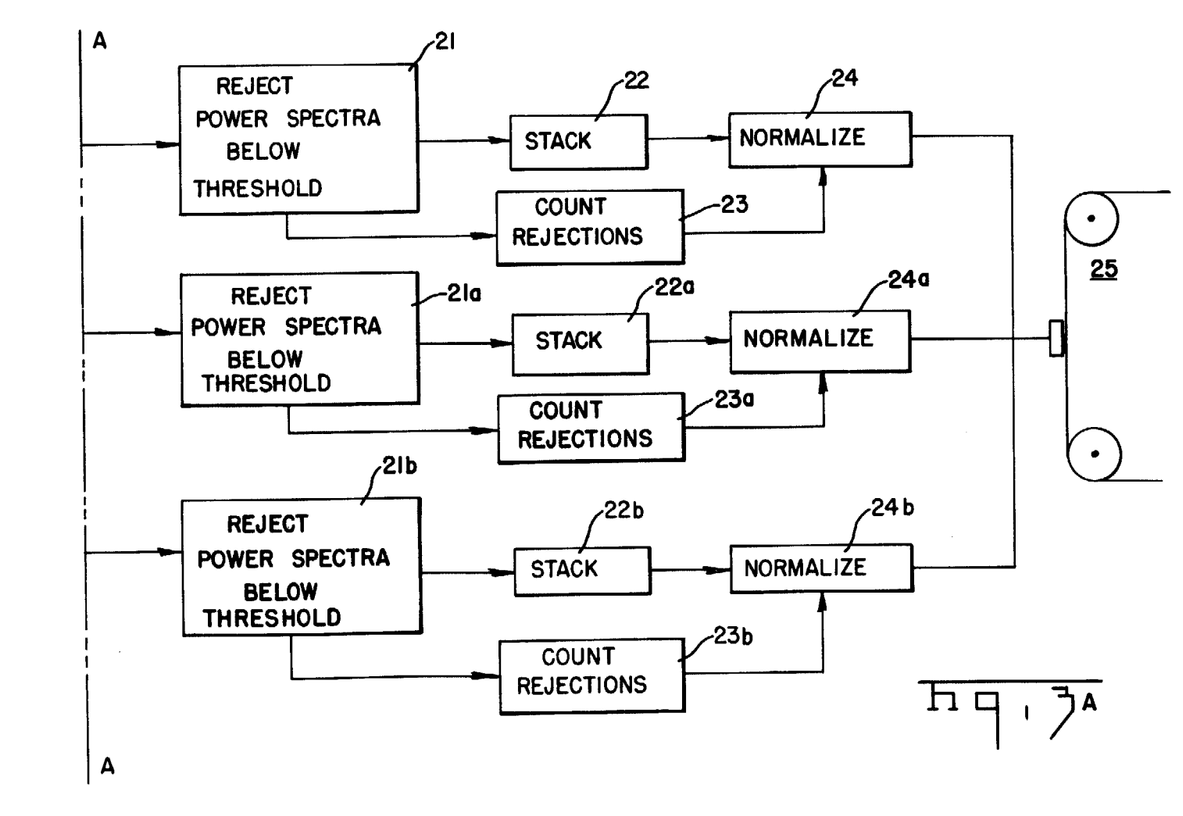

The present invention rejects those measurements having noise spikes such as the noise 30 in FIG. 2J and the noise spikes 31-35 in FIG. 2D. The usefulness of the invention is demonstrated by FIGS. 4 and 4A. These show resistivity for frequency estimates obtained from 32,768 sample points. In FIG. 4, the coherence filter of the present invention was not used. Five acceptable frequency estimates were obtained from all 32,768 sample points. In FIG. 4A, the coherence filter of this invention was used. Ten acceptable frequency estimates were obtained from about one-fourth of the 32,768 sample points.

The invention as shown in FIG. 3 can be implemented with hard wired digital circuits. However, the preferred embodiment uses a general purpose minicomputer to prepare the magnetotelluric measurements for recording in the field. One minicomputer which is suitable for such field use is the Digital Equipment Corporation PDP 11 series (e.g., DEC PDP 11/05). The PDP 11 series is available in a number of both minicomputer and microcomputer (or microprocessor) configurations. Other manufacturers have similar series of mini- and microcomputers. The programming will be apparent from the foregoing description and the users' manual for the particular computer used. The following program is given by way of example. This program is written in Fortran for use on a CDC Cyber 70 system.

| SUBROUTINE CHFT | | | 74/175 OPT=1 TRACE | FTN 4.6+460 | 11/30/79 | 15.53.07 |
|---|---|---|---|---|---|---|
| 1 | | | SUBROUTINE CHFT(K) | | COHFLT | 52 |
| | | | COMPLEX CXSP,POWR,CXS2 | | COHFLT | 53 |
| | | | COMMON/CXP/CXSP(50,120),CXS2(50,120) | | COHFLT | 54 |
| | | | COMMON/RPW/POWR(50,120) | | COHFLT | 55 |
| 5 | | | COMMON/ICPT/ ICPT(50,120),JCHSW,ITRG(50) | | COHFLT | 56 |
| | | | DIMENSION JIS (40,15) | | COHFLT | 57 |
| | | | | | COHFLT | 58 |
| | C | | | | | |
| | C | | THIS SUBROUTINE CALCULATES VARIOUS COHERENCES BETWEEN | | COHFLT | 59 |
| | C | | ORTHOGONAL E AND H COMPONENTS FOR THE 2 FREQUENCIES | | COHFLT | 60 |
| 10 | C | | ATEACH LEVEL OF DECIMATION, FOLLOWING EACH | | COHFLT | 61 |
| | C | | 32 POINT TRANSFORM. IF THESE COHERENCES CHEX, | | COHFLT | 62 |
| | C | | AND CHEY EACH EXCEED A SET LEVEL, EL, AND | | COHFLT | 63 |
| | C | | THE HX-HY COHERENCE CHHL IS LESS THAN A SET LEVEL, | | COHFLT | 64 |
| | C | | HL THEN ALL CROSS POWERES ARE STACKED AND [CPT | | COHFLT | 65 |
| 15 | C | | COUNTER IS INCREMENTED AT ALL 150 INDEXES FOR LATER | | COHFLT | 66 |
| | C | | NORMALLIZATION](GUS HOEHN( | | COHFLT | 67 |
| | | | DO 10 IJ=1,120 | | COHFLT | 68 |
| | | | CXS2(K,IJ)=CXS2(K,IJ)=CXSP(K,IJ) | | COHFLT | 69 |
| | | 10 | CONTINUE | | COHFLT | 70 |
| 20 | | | IF (ITRG(K).EQ.1)GO TO 20 | | COHFLT | 71 |
| | | | ITRG(K)=1 | | COHFLT | 72 |
| | | | DO 15 I=1,15 | | COHFLT | 73 |
| | | | JIS(K,I)=1 | | COHFLT | 74 |
| | | 15 | CONTINUE | | COHFLT | 75 |
| 25 | | | GO TO 500 | | COHFLT | 76 |
| | | 20 | CONTINUE | | COHFLT | 77 |
| | | | CHHL =CABS(CXS2(K, 2)/(CSQRT(CXS2(K, 1)*CXS2(K, 16)))) | | COHFLT | 78 |
| | | | CHEX1=CABS(CXS2(K,18)/(CSQRT(CXS2(K,16)*CXS2(K, 43)))) | | COHFLT | 79 |
| | | | CHEX2=CABS(CXS2(K,20)/(CSQRT)CXS2(K,16)*CXS2(K, 66)))) | | COHFLT | 80 |
| 30 | | | CHEX3=CABS(CXS2(K,22)/(CSQRT(CXS2(K,16)*CXS2(K,85)))) | | COHFLT | 81 |
| | | | CHEX4=CABS(CXS2(K,24)/(CSQRT(CXS2(K,16)*CXS2(K,100)))) | | COHFLT | 82 |
| | | | CHEX5=CABS(CXS2(K,26)/(CSQRT(CXS2(K,16)*CXS2(K,111)))) | | COHFLT | 83 |
| | | | CHEX6=CABS(CXS2(K,28)/(CSQRT(CXS2(K,16)*CXS2(K,118)))) | | COHFLT | 84 |
| | | | CHEY1=CABS(CXS2(K, 5)/(CSQRT(CXS2(K, 1)*CXS2(K, 55)))) | | COHFLT | 85 |
| 35 | | | CHEY2=CABS(CXS2(K, 7)/(CSQRT(CXS2(K, 1)*CXS2(K, 76)))) | | COHFLT | 86 |
| | | | CHEY3=CABS(CXS2(K, 9)/(CSQRT(CXS2(K, 1)*CXS2(K, 93)))) | | COHFLT | 87 |
| | | | CHEY4=CABS(CXS2(K,11)/(CSQRT(CXS2(K, 1)*CXS2(K,106)))) | | COHFLT | 88 |
| | | | CHEY5=CABS(CXS2(K,13)/(CSQRT(CXS2(K, 1)*CXS2(K,115)))) | | COHFLT | 89 |
| | | | CHEY6=CABS(CXS2(K,15)/(CSQRT(CXS2(K, 1)*CXS2(K,120)))) | | COHFLT | 90 |
| 40 | | | HL=.65 | | COHFLT | 91 |
| | | | EL=.90 | | COHFLT | 92 |
| | | | IF (CHEX1.G1.HL.AND.CHES2.GT.HL.AND.CHEX3.GT.HL.AND.CHEX4.GT. | | COHFLT | 93 |
| | | 1 | HL.AND.CHEX5.GT.HL.AND.CHEX6.GT.HL.AND.CHEY1.GT.HL.AND.CHEY2. | | COHFLT | 94 |
| | | 3 | GT.HL.AND.CHEY3.GT.HL.AND.CHEY4.GT.HL.AND.CHEY5.GT.HL.AND. | | COHFLT | 95 |
| 45 | | 4 | CHEY6.GT.HL) GO TO 50 | | COHFLT | 96 |
| | | | DO 40 J=1,15 | | COHFLT | 97 |
| | | | JIS(K,J)=0 | | COHFLT | 98 |
| | | 40 | CONTINUE | | COHFLT | 99 |
| | | 50 | CONTINUE | | COHFLT | 100 |
| 50 | | | PRINT 9150,CHHL,CHEX1,CHEX2,CHEX3,CHEX4,CHEX5,CHEX6 | | COHFLT | 101 |
| | | U | CHEY1,CHEY2,CHEY3,CHEY4,CHEY5,CHEY6 | | COHFLT | 102 |
| | | 9150 | FORMAT( 8X,13H8.5) | | COHFLT | 103 |
| | | | PRINT 9151,K,JIS(K,1),JIS(K,4),JIS(K,6),JIS(K,8),JIS(K,10), | | COHFLT | 104 |
| | | 1 | JIS(K,12),JIS(K,14),JIS(K,5),JIS(K,7),JIS(K,9),JIS(K,11), | | COHFLT | 105 |
| 55 | | 2 | JIS(K,13),JIS(K,15) | | COHFLT | 106 |
| | | 9151 | FORMAT (2X,14I8) | | COHFLT | 107 |
| | | | INSP=INSP+1 | | COHFLT | 108 |
| | | 150 | CONTINUE | | COHFLT | 109 |
| | | | IJ=0 | | COHFLT | 110 |
| 60 | | | DO 300 I=1,15 | | COHFLT | 111 |
| | | | DO 200 J=I,15 | | COHFLT | 112 |
| | | | IJ=IJ+1 | | COHFLT | 113 |
| | | | POWR(K,IJ)=POWR(K,IJ)+CXS2(K,IJ)*JIS(K,I)*JIS(K,J) | | COHFLT | 114 |
| | | | ICPT(K,IJ)=JIS(K,I)*JIS(K,J) + ICPT(K,IJ) | | COHFLT | 115 |
| 65 | | 200 | CONTINUE | | COHFLT | 116 |
| | | 300 | CONTINUE | | COHFLT | 117 |
| | | | DO400 J=1,120 | | COHFLT | 118 |
| | | | CXS2(K,J)=(0.0,0.0) | | COHFLT | 119 |
| | | 400 | CONTINUE | | COHFLT | 120 |
| 70 | | | ITRG(K)=C | | COHFLT | 121 |
| | | 500 | RETURN | | COHFLT | 122 |
| | | | END | | COHFLT | 123 |

SYMBOLIC REFERENCE MAP (R=2)
ENTRY POINTS   DEF LINE   REFERENCES
   3 CHFT              1          71
VARIABLES   SN   TYPE           RELOCATION

-continued

| | | | | | | | | | | | |
|---|---|---|---|---|---|---|---|---|---|---|---|
| 576 CHEX1 | REAL | | | REFS | 42 | 50 | DEFINED | 28 | | | |
| 577 CHEX2 | REAL | | | REFS | 42 | 50 | DEFINED | 29 | | | |
| 600 CHEX3 | REAL | | | REFS | 42 | 50 | DEFINED | 30 | | | |
| 601 CHEX4 | REAL | | | REFS | 42 | 50 | DEFINED | 31 | | | |
| 602 CHEX5 | REAL | | | REFS | 42 | 50 | DEFINED | 32 | | | |
| 603 CHEX6 | REAL | | | REFS | 42 | 50 | DEFINED | 33 | | | |
| 604 CHEY1 | REAL | | | REFS | 42 | 50 | DEFINED | 34 | | | |
| 605 CHEY2 | REAL | | | REFS | 42 | 50 | DEFINED | 35 | | | |
| 606 CHEY3 | REAL | | | REFS | 42 | 50 | DEFINED | 36 | | | |
| 607 CHEY4 | REAL | | | REFS | 42 | 50 | DEFINED | 37 | | | |
| 610 CHEY5 | REAL | | | REFS | 42 | 50 | DEFINED | 38 | | | |
| 611 CHEY6 | REAL | | | REFS | 42 | 50 | DEFINED | 39 | | | |
| 575 CHHL | REAL | | | REFS | 50 | DEFINED | 27 | | | | |
| 0 CXSP | COMPLEX | ARRAY | CXP | REFS | 2 | 3 | 18 | | | | |
| 27340 CXS2 | COMPLEX | ARRAY | CXP | REFS | 2 | 3 | 18 | 3*27 | 3*28 | 3*29 | 3*30 |
| | | | | 3*31 | 3*32 | 3*33 | 3*34 | 3*35 | 3*36 | 3*37 | 3*38 |
| | | | | 3*39 | 63 | DEFINED | 18 | 68 | | | |
| 613 EL | REAL | | | DEFINED | 41 | | | | | | |
| 612 HL | REAL | | | REFS | 12*42 | DEFINED | 40 | | | | |
| 574 I | INTEGER | | | REFS | 23 | 51 | 63 | 64 | DEFINED | 22 | 60 |
| 0 ICPT | INTEGER | ARRAY | ICPT | REFS | 5 | 64 | DEFINED | 64 | | | |
| 573 IJ | INTEGER | | | REFS | 3*18 | 62 | 3*63 | 2*64 | DEFINED | 17 | 59 |
| | | | | 62 | | | | | | | |
| 615 INSP | INTEGER | | | REFS | 57 | DEFINED | 57 | | | | |
| 13561 ITRG | INTEGER | ARRAY | ICPT | REFS | 5 | 20 | DEFINED | 21 | 70 | | |
| 614 J | INTEGER | | | REFS | 47 | 63 | 64 | 68 | DEFINED | 46 | 61 |
| | | | | 67 | | | | | | | |
| 13560 JCHSW | INTEGER | | ICPT | REFS | 5 | | | | | | |
| 616 JIS | INTEGER | ARRAY | | REFS | 6 | 13*53 | 2*63 | 2*64 | DEFINED | 23 | 47 |
| 0 K | INTEGER | | F.P. | REFS | 3*18 | 20 | 21 | 23 | 3*27 | 3*28 | 3*29 |
| | | | | 3*30 | 3*31 | 3*32 | 3*33 | 3*34 | 3*35 | 3*36 | 3*37 |

After the statement "20 CONTINUE", the various coherence functions are determined. CHEX1 is the coherence function $E_{x1}*H_y$; CHEX2 is the coherence function $E_{x1}H_y$ and so on. CHEY1 is the coherence function $E_{y1}H_x$ and so on. There are two thresholds available, $H_L=0.65$ and $EL=0.90$. Various thresholds can be assigned depending on experience, or on quantity of data rejected. The program includes an IF test to determine if the coherences are greater than these thresholds. If the coherences are greater than the threshold there is a jump to statement 50, after which the power spectra are stacked. The stacking occurs in the statements POWR (K,I,J)= ... and ICPT (K,I,J)= . . . .

While a particular embodiment has been shown and described, various modifications are within the true spirit and scope of the invention. The appended claims are, therefore, intended to cover all such modifications.

What is claimed is:

1. In magnetotelluric exploration wherein channels of measurements are made of the earth's electric and magnetic field as a function of time, said channels representing said measurements at spaced locations on the earth's surface, the method of storing said measurements comprising:
   digitizing samples of said measurements;
   selecting blocks of samples of said measurements;
   transforming said blocks into frequency domain representations of the power spectra, including amplitude and phase, at selected harmonics;
   determining the coherence between said power spectra for two successive blocks of said samples from different channels of said measurements, said coherence being represented by values which are high to indicate high coherence and low to represent low coherence;
   comparing said coherence to a threshold;
   stacking the power spectra which have a coherence exceeding said threshold; and
   storing the stacked power spectra of selected harmonics of said measurements.

2. The method recited in claim 1 further comprising:
   successively filtering said samples to produce successively lower frequency samples; and
   repeating said steps of selecting, transforming, determining, comparing, stacking and storing for each of said successively lower frequency samples.

3. The method recited in claim 2 wherein said filtering is performed at successive levels in which the sampling interval is twice the interval of the previous level.

4. The method recited in claim 1 further comprising:
   counting the number of stacked power spectra; and
   normalizing the stacked power spectra with said number.

5. Apparatus for storing channels of measurements of the earth's electric and magnetic field obtained as a function of time, said channels representing said measurements at spaced locations on the earth's surface in magnetotelluric exploration, said apparatus comprising:
   a digitizer, said measurements being applied to said digitizer to produce digital samples of said measurements at sampling intervals;
   means for transforming blocks of said samples into frequency domain representations of the power spectra, including amplitude and phase, at selected harmonics;
   coherence determining means, said power spectra for two successive blocks of said samples from different channels of said measurement being applied to said coherence determining means to produce coherence functions representing the coherence between measurements from different channels, said coherence being represented by values which are high to indicate high coherence and low to represent low coherence;
   a comparator, said coherence functions being applied to said comparator where they are compared to a threshold;

means for stacking the power spectra having coherence functions which exceed said threshold; and means for storing the stacked power spectra.

6. The apparatus recited in claim 5 wherein said means for storing comprises:

a magnetic tape transport for storing the stacked power spectra of selected harmonics of said measurements.

7. The apparatus recited in claim 5 further comprising:

digital filters, said digital samples being applied to said filters to produce samples at successive levels in which the sampling interval is longer than said first named sampling interval, the measurements at said successively longer sampling intervals being applied to said means for transforming into frequency domain representations of the power spectra so that the stacked power spectra of said selected harmonics of successively decimated measurements are stored.

8. The apparatus recited in claim 5 wherein said means for transforming, coherence determining means, said comparator, and said means for stacking are part of a general purpose digital computer.

9. In magnetotelluric exploration wherein channels of measurements are obtained of the earth's electric and magnetic field as a function of time, said channels representing said measurements at spaced locations on the earth, and wherein said measurements are digitized and stored, the method of removing noise spikes from said measurements comprising:

selecting blocks of samples of said measurements;

transforming said blocks into frequency domain representations of power spectra, including amplitude and phase, at selected harmonics;

determining the coherence between said power spectra for two successive blocks of said samples representing measurements from different channels, said coherence being represented by values which are high to indicate high coherence and low to represent low coherence;

comparing said coherence to a threshold; and stacking the power spectra which have a coherence exceeding said threshold whereby measurements having said noise spikes are not stacked.

10. The method recited in claim 9 further comprising:

successively filtering said samples to produce successively lower frequency samples; and repeating said steps of selecting, transforming, determining, comparing, stacking and storing for each of said successively lower frequency samples.

* * * * *